J. P. FOX.

DIRIGIBLE HEADLIGHT.

APPLICATION FILED OCT. 25, 1913.

Reissued Sept. 25, 1917. 14,366.

*Witnesses:*
Horace A. Cosseman
Carl L. Choate.

*Inventor:*
Joseph Patrick Fox,
by Finney, Brown, Jarvis and Vance
Attys.

UNITED STATES PATENT OFFICE.

JOSEPH P. FOX, OF PROVIDENCE, RHODE ISLAND, ASSIGNOR OF ONE-HALF TO OTTO RIEMANN, OF CHEMNITZ, GERMANY.

DIRIGIBLE HEADLIGHT.

14,366. Specification of Reissued Letters Patent. Reissued Sept. 25, 1917.

Original No. 1,038,739, dated September 17, 1912, Serial No. 633,581, filed June 16, 1911. Application for reissue filed October 25, 1913. Serial No. 797,345.

*To all whom it may concern:*

Be it known that I, JOSEPH P. FOX, a citizen of the United States, and a resident of Providence, in the county of Providence and State of Rhode Island, have invented an Improvement in Dirigible Headlights, of which the following description, in connection with the accompanying drawings, is a specification, like characters on the drawings representing like parts.

This invention relates to mechanism for adjusting the lamps of power driven vehicles.

The mechanism is distinguished from known devices serving similar purposes in that it admits of both the adjustment of the lamps in the direction of travel for the time being by means of the steering gear and also deflecting the lamps by hand by the steering gear while traveling, or when the vehicle is stationary. The arrangement is such that, in the latter instance the lamps can either be arrested in their middle position, or be turned laterally, or tilted as desired by hand.

Important objects of the invention are to provide that when traveling by day or through lighted streets, that is to say when it is not necessary to control the position of the lamps, it is possible both conveniently to disconnect the adjusting mechanism from the steering gear and also to deflect the lamps by hand when traveling at night for the purpose of orientation, *i. e.*, by illuminating the mile stones, sign posts, the house numbers, etc. These ends are attained by driving the motion for the lamps from the steering wheel or from a part of the steering gear located near the driver's seat in the disclosed embodiment of the invention, with the aid of a detachable clutch. In the preferred form of the invention this clutch is in the form of a lever pivotally attached on the one hand to a part of the adjusting mechanism and on the other hand detachably attached to the steering wheel, or other suitable part of the steering gear within reach of the driver's seat. This arrangement has the additional advantage that flickering or trembling of the light caused by the sluing movement of the steering wheels on uneven roads is avoided.

Figure 1:
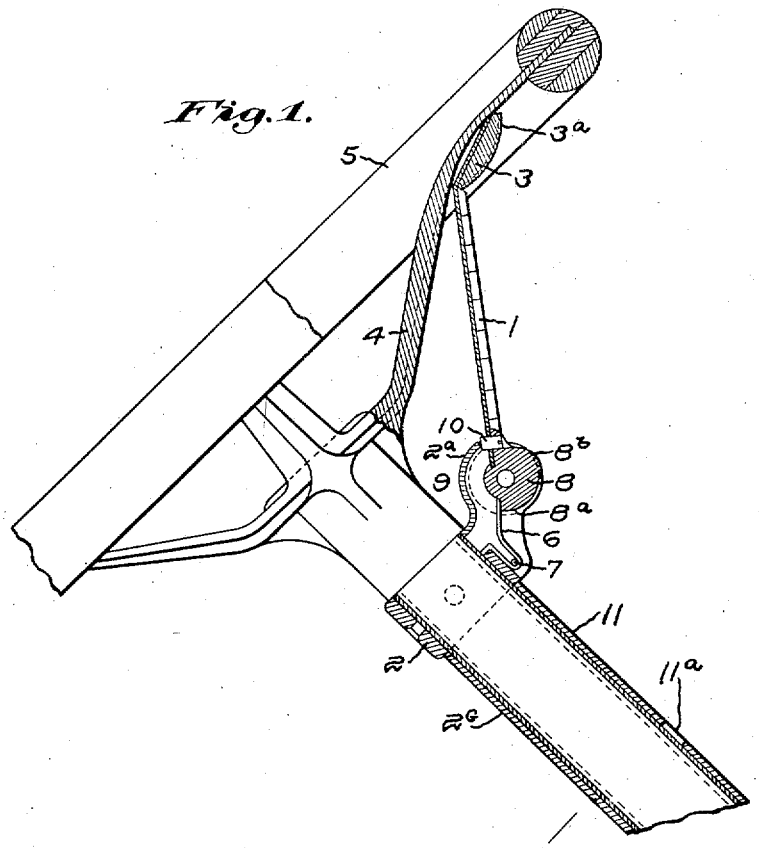
Figure 2:
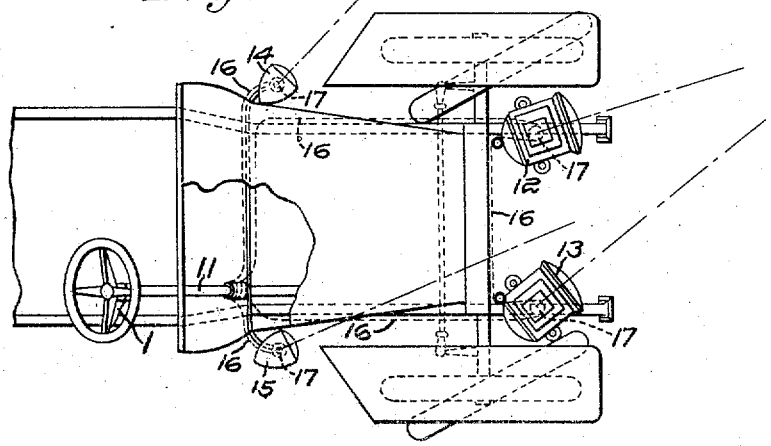

An illustrative embodiment of the invention is represented by way of example in the accompanying drawing, wherein, Figure 1 is a section through the steering wheel and steering column and shows the mechanism for throwing the adjusting device into and out of gear;

Fig. 2 is a top view of the front part of a motor car showing rotatably mounted lamps on the vehicles, and connections between the lamps and the steering mechanism;

Referring to the drawings, Fig. 1, the lever 1 is pivotally connected to a sleeve 2, or to a bracket like extension $2^a$ thereof, by which the lamps are driven;—that is adjusted or turned. For coupling the sleeve with the steering wheel the outer end 3 of the lever 1 is used, its shape being clearly shown in Fig. 1. The end 3 of the lever embraces a spoke 4 of the steering wheel 5 in such a manner that it can be easily disconnected.

In the position shown in the drawings the lever 1 is firmly pressed against the spoke 4 by a spring 6 arranged about a pin 7. When the clutch is disengaged, *i. e.*, the lever 1 is rocked downward, this spring slides over a suitably shaped shoulder $8^a$ on the hinges 8, 9 of the lever 1 and when the lever has arrived in its vertical position lies behind a curved projection $8^b$ of the end of the lever, whereby the lever is again locked.

The lever 1 is preferably made of spring steel so that the clutch can be automatically disengaged when excessive resistance occurs in consequence of parts of the mechanism for adjusting the lamps jamming. In this manner, or otherwise, by similar arrangement, all danger to the occupants of the vehicle, owing to the mechanism for adjusting the lamps breaking down, is avoided. In order, in the latter instance, that the lever arm 1 cannot jump between the spokes of the steering wheel, a set screw 10 is provided abutting against the extension $2^a$ of the sleeve 2.

When the clutch lever 1 is rocked downward out of the position in the drawing into its vertical position, the adjusting mechanism is disengaged from the steering gear and the lamps remain arrested in their middle position. Obviously the lever can be actuated by hand in every intermediate position in a convenient manner for turning the lamps. If the lamps are to be arrested after the lever 1 has been disengaged from the steering wheel, the same can take place in the lowered position of the lever by hooking its outer end into a suitable hole 11[a] in the fixed steering column 11.

For the transmission of motion from the detachable lever to the lamps, I interpose suitable transmission members and gearing at any suitable place in the transmission mechanism. This gearing may comprise levers, screws, pulleys, toothed gears, or the like, and the transmission may be tubes, shafts, ropes, flexible shafts, cables or the like. In a preferred form of the invention as shown in Fig. 2, the transmission of motion from the steering gear; or from the detachable clutch lever "1" tube "2[b]", to the rotatably mounted lamps "12, 13, 14 and 15", is arranged for by means of cables or the like 16 which are wound around the tube "2[b]" of the steering gear and around the turning shafts "17" to which the lamps are fixed. The diameter of that part of the shafts "17" around which the cables are wound will determine the angle at which each lamp will be turned.

Having thus described one illustrative embodiment of my invention, I desire to be understood that although specific terms are employed, they are used in a generic and descriptive sense and not for purposes of limitation, the scope of the invention being set forth in the following claims.

Claims:

1. In means for adjusting the lamps of motor-driven vehicles in various directions, the combination, with the steering-gear and rotatably mounted lamps on the vehicle, of means comprising a detachable clutch member adapted to be driven both by a part of the steering-gear within reach of the driver's seat and by hand from the driver's seat for adjusting the position of the lamps and holding them stationary.

2. In means for adjusting the lights of motor driven vehicles in various directions, the combination, with the steering-gear and rotatably mounted lights on the vehicle, of means controlled from the driver's seat, connecting the lights with the steering-gear, said means comprising a resilient clutch member automatically and manually detachable.

3. In means for adjusting the lamps of motor driven vehicles in various directions, the combination, with the steering-column having a steering-wheel, a transmission member and rotatably mounted lamps on the vehicle, of means for adjusting the position of the lamps, comprising a lever having one end pivotally connected with the transmission member 2 for controlling the lamps and the other end detachably connected with the steering-wheel.

4. In means for adjusting the lamps of motor driven vehicles in various directions, the combination, with the steering-column, having a steering-wheel, a transmission member and rotatably mounted lamps on the vehicle, of means for adjusting the position of the lamps, comprising a resilient lever having one end pivotally connected with the transmission member 2 for controlling the lamps and the other end normally detachably connected with the steering-wheel, and a spring normally holding the lever in position, said lever being adapted to be locked by the spring after it has been disengaged from the steering-wheel.

5. In means for adjusting a motor-driven vehicle lamp, the combination with the steering gear and a lamp mounted upon the vehicle for turning movement, and a lamp-turning clutch mounted co-axially with said steering gear and operable from the driver's seat, said clutch being detachably connected with and directly driven by the steering gear.

6. In means for adjusting a lamp of a motor driven vehicle, the combination with steering gear including a steering column and its wheel, of a lamp rotatably mounted upon the vehicle, and means including a member within reach of the driver's seat for detachable connection with the steering gear, whereby the position of the lamp may be adjusted by the motion of the steering gear or manually independently of it.

7. In means for adjusting a lamp of a motor driven vehicle, the combination with means manually operable to steer the vehicle, of a lamp rotatably mounted upon the vehicle, and means adapted to be operated by said steering means having provision for ready detachable connection therewith within reach of the driver's seat, whereby the position of the lamp may be adjusted by the motion of said steering means or manually independently of it.

8. In means for directing the lights of motor-driven vehicles in various directions relative to the vehicle, the combination with the steering gear and movably mounted lights on the vehicle, of clutch means for engagement with a part of the steering gear for directing the lights by the movement of the steering gear and for disengagement from said steering gear for directing the lamps independently of movement of said steering gear.

9. In dirigible lighting apparatus for a motor-driven vehicle, the combination of a steering post, an annular member rotatably surrounding said steering post, a lever pivoted on said annular member, and flexible transmission means for transmitting movement from said lever to the lights of the motor vehicle.

In testimony whereof, I have signed my name to this specification, in the presence of two subscribing witnesses.

JOSEPH P. FOX.

Witnesses:
MAY H. LOWRY,
ROBERT H. KAMMLER.

Copies of this patent may be obtained for five cents each, by addressing the "Commissioner of Patents, Washington, D. C."